US009766623B2

(12) United States Patent
Moe et al.

(10) Patent No.: US 9,766,623 B2
(45) Date of Patent: Sep. 19, 2017

(54) DETECTION AND TRACKING OF LAND, MARITIME, AND AIRBORNE OBJECTS USING A RADAR ON A PARASAIL

(71) Applicant: Vista Research, Inc., Sunnyvale, CA (US)

(72) Inventors: George W. Moe, Columbia, MD (US); Phillip A. Fox, Hertford, NC (US); Joseph W. Maresca, Jr., Sunnyvale, CA (US)

(73) Assignee: Vista Research, Inc., Sunnyvale, CA (US)

( * ) Notice: Subject to any disclaimer, the term of this patent is extended or adjusted under 35 U.S.C. 154(b) by 878 days.

(21) Appl. No.: 13/739,382

(22) Filed: Jan. 11, 2013

(65) Prior Publication Data

US 2015/0268337 A1 Sep. 24, 2015

Related U.S. Application Data

(60) Provisional application No. 61/585,468, filed on Jan. 11, 2012.

(51) Int. Cl.
 *G01S 13/66* (2006.01)
 *G01S 7/04* (2006.01)
 (Continued)

(52) U.S. Cl.
 CPC ............ *G05D 1/0022* (2013.01); *G01S 7/003* (2013.01); *G01S 13/04* (2013.01); *G01S 13/867* (2013.01);
 (Continued)

(58) Field of Classification Search
 CPC ........ G01S 13/66; G01S 13/04; G01S 13/867; G01S 7/411; G01S 7/046; G01S 13/89;
 (Continued)

(56) References Cited

U.S. PATENT DOCUMENTS

| 4,907,001 A * | 3/1990 | Harmuth ................. G01S 7/412 342/159 |
| 7,055,777 B2 * | 6/2006 | Colting ..................... B64B 1/02 244/30 |

(Continued)

FOREIGN PATENT DOCUMENTS

WO   WO 2009022889 A1 *   2/2009   ............... B64B 1/00

*Primary Examiner* — Brian P Sweeney

(74) *Attorney, Agent, or Firm* — Schwegman Lundberg & Woessner, P.A.

(57) ABSTRACT

A method and apparatuses may be provided for detection, tracking, and classification of one or more land, maritime, or airborne objects using a real-aperture radar mounted on a parasail airborne platform. Both wide-area and localized radar surveillance can be provided, and the radar can be either a non-coherent radar or coherent radar. A method and apparatus may use a low-cost, rotating, single-beam, non-coherent, X-band radar that is mounted on an unmanned powered parasail and operated remotely like an Unattended Airborne System (UAS). The parasail, which may be expendable or recoverable, manned or unmanned, powered or unpowered, may have a low operational cost, can carry a heavy payload, stay on station for a long time, circle or move to a specified location for surveillance, operate at an optimal altitude and look-angle, and automatically cue or manually steer an EO/IR camera to a target of interest for classification and identification.

18 Claims, 4 Drawing Sheets

(51) Int. Cl.

| | | |
|---|---|---|
| *G01S 13/04* | (2006.01) | |
| *G01S 13/86* | (2006.01) | |
| *G01S 13/89* | (2006.01) | |
| *G01S 7/41* | (2006.01) | |
| *G05D 1/00* | (2006.01) | |
| *H04N 7/18* | (2006.01) | |
| *G01S 7/00* | (2006.01) | |
| *G01S 13/88* | (2006.01) | |
| *G01S 13/42* | (2006.01) | |
| *G01S 13/91* | (2006.01) | |

(52) U.S. Cl.
CPC ............... *G01S 13/88* (2013.01); *G01S 7/046* (2013.01); *G01S 13/426* (2013.01); *G01S 13/886* (2013.01); *G01S 13/89* (2013.01); *G01S 13/91* (2013.01)

(58) Field of Classification Search
CPC .......... G01S 7/003; G01S 13/88; G01S 13/91; G01S 13/426; G01S 13/886; G05D 1/0022; H04N 7/181
USPC ........................................................... 701/2
See application file for complete search history.

(56) References Cited

U.S. PATENT DOCUMENTS

| | | | |
|---|---|---|---|
| 2003/0222811 A1* | 12/2003 | Halsey .................. | G01S 7/003 342/74 |
| 2011/0127378 A1* | 6/2011 | McDonnell ............... | 244/110 F |
| 2014/0183300 A1* | 7/2014 | MacCulloch et al. ..... | 244/1 TD |

* cited by examiner

DETECTION AND TRACKING OF LAND, MARITIME, AND AIRBORNE OBJECTS USING A RADAR ON A PARASAIL

CROSS-REFERENCE TO RELATED PATENT DOCUMENTS

This patent application claims the benefit of priority, under 35 U.S.C. §119(e), to U.S. Provisional Patent Application Ser. No. 61/585,468 titled "Detection and Tracking of Land, Maritime, and Airborne Objects Using a Radar on a Parasail," filed on Jan. 11, 2012, which is incorporated by reference in its entirety.

TECHNICAL FIELD

This patent document pertains generally to radar systems, and more particularly, but not by way of limitation, to detection and tracking of land, maritime, and airborne objects using a radar on a parasail.

BACKGROUND

Radar systems are used to detect targets in a variety of environments. Coherent radars are often expensive and therefore may be impractical to use on a large scale. Non-coherent radars are cheaper, but may be less accurate than coherent radars in some environments.

SUMMARY OF THE INVENTION

Various example method and apparatuses are provided for persistent, localized, and/or wide-area surveillance of land, maritime, and/or airborne objects from a radar on an airborne platform comprised of a parasail or parachute, which may be manned or unmanned and powered, unpowered, or towed.

Various example method and apparatuses are provided for persistent, localized, and/or wide-area surveillance of land, maritime, and/or airborne objects from a radar on an airborne platform comprised of a parasail or parachute, which moves slow enough or hoovers in a small area by circling so that slowly moving land targets can be detected and tracked.

Various example method and apparatuses are provided for surveillance of a border, property, facility, or military asset with a radar on a parasail or parachute unmanned aerial system (UAS).

Various example method and apparatuses are provided for surveillance of land, maritime, and/or airborne objects in the vicinity of a border, property, facility, or military asset with a radar on a parasail or parachute UAS.

Various example method and apparatuses are provided for surveillance of land, maritime, and/or air objects in the vicinity of a border, property, facility, or military asset with a radar and an electro-optical/infrared (EO/IR) camera system or a suite of other sensors on a parasail or parachute UAS.

Various example method and apparatuses are provided for surveillance of land, maritime, and/or airborne objects from a radar on a platform comprised of a parasail or parachute, which may be manned or unmanned, powered, unpowered, or towed, and launched from a maritime platform such as a ship, surface vessel, offshore platform, buoy, or port facility.

Various example method and apparatuses are provided for surveillance of land, maritime, and/or airborne objects from a radar on a platform comprised of a parasail or parachute, which may be manned or unmanned, powered, unpowered, or towed, and launched from a land platform such as a vehicle, trailer, tower, land area, or aerostat.

Various example method and apparatuses are provided for surveillance of land, maritime, and/or air objects from a radar on a platform comprised of a parasail or parachute, which may be manned or unmanned, powered, unpowered, or towed, and launched from an airborne platform such as an airplane, helicopter, or parasail/parachute-based platform.

Various example method and apparatuses are provided for detection, tracking, and/or first level classification of land, maritime, or airborne targets with a radar in a slowly moving airborne or hovering platform comprised of a parasail or parachute, which may be manned or unmanned, powered, unpowered, or towed, and cueing an EO/IR camera sensing system with the radar for classification and/or identification of these objects.

Various example method and apparatuses are provided for smart sensor radar processing of the data obtained from the radar on a platform comprised of a parasail or parachute, which may be manned or unmanned, powered, unpowered, or towed for detection, tracking and/or first-level classification of land, maritime, or airborne targets.

Various example method and apparatuses are provided for smart sensor radar processing of the data obtained from the radar on a platform comprised of a parasail or parachute, which may be manned or unmanned, powered, unpowered, or towed for detection, tracking and first-level classification of land, maritime, or airborne targets and cueing an EO/IR camera sensing system with the radar for classification and identification of land, maritime, and/or airborne objects.

Various example method and apparatuses are provided for the detection, tracking, and classification and/or identification of land, maritime, and airborne objects using a radar on an airborne platform comprised of a manned or unmanned powered parasail UAS that can be launched from a confined space on a maritime, land or airborne platform. The higher elevation of the radar can allow for a wider coverage area than other land-based platforms such as towers, vehicles, or ships. A towed or free flying parasail can also be used. In an embodiment a low-cost, X-band, non-coherent radar is used. The present disclosure describes examples using a real-aperture, single-beam radar and the detection and tracking capabilities of a real-aperture radar system vice synthetic aperture radars used on faster moving platforms or platforms with less payload capabilities. Alternatively, a coherent Doppler radar can also be used. An EO/IR camera or a suite of additional sensors can be used for identification and/or classification of the targets being tracked.

BRIEF DESCRIPTION OF THE DRAWINGS

Some embodiments are illustrated by way of example and not limitation in the figures of the accompanying drawings in which.

DETAILED DESCRIPTION

Figure 1:
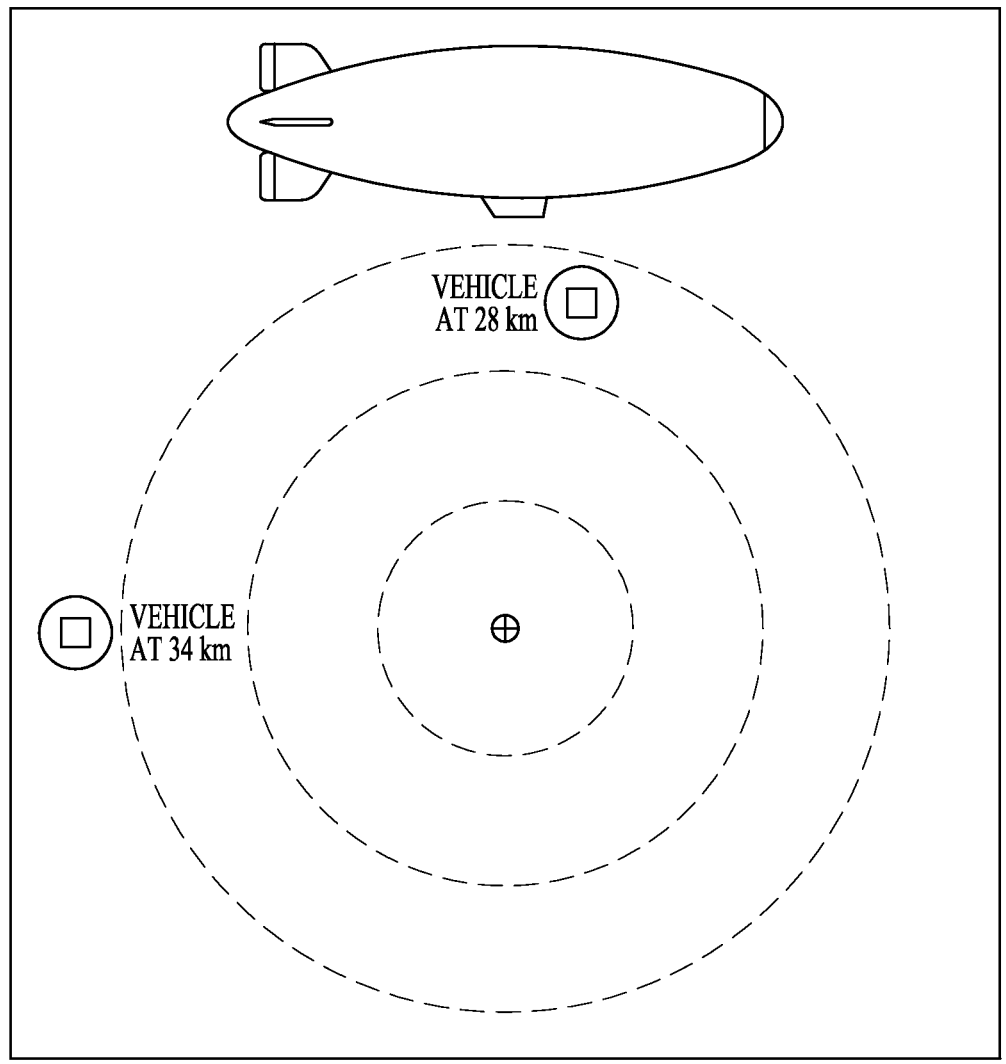
FIG. 1 is a diagram illustrating the use of a radar on an aerostat, according to example embodiment.

In the following description, for purposes of explanation, numerous specific details are set forth in order to provide a thorough understanding of some example embodiments. It will be evident, however, to one skilled in the art that the present invention may be practiced without these specific details.

In various examples, the present disclosure addresses deficiencies in the current state of the art. First, it adds a radar detection and tracking capability to a special type of low-cost UAS. Second, the slow speed of the described apparatuses may allow the detection and tracking of slowly moving land targets like people. Third, the addition of smart radar processing algorithms may allow the efficient use of EO/IR cameras because of the extremely low false alarm rate of the radar that results with the use of these processing algorithms. Fourth, because of the mobility of the apparatuses and methods of the present disclosure, distinct coverage and concept of operations (conops) advantages over fixed platforms like towers, aerostats, vehicles, and ships may be realized. Similarly, there may be distinct visibility advantages over towers, vehicles, and ships, and significant cost advantages over these and all other types of platforms.

A high level of detection and tracking performance may be achieved using low-cost radars, particularly low-cost, non-coherent X-band radars widely used for maritime navigation, when they are combined with smart-sensor radar processing methods and algorithms such as those taught by Fox, et. al., in U.S. patent application Ser. No. 11/811,353, now U.S. Pat. No. 8,330,647 and Abileah, et. al., in US Provisional Application Ser. No. 61/404,74, which are both hereby incorporated by reference in their entirety.

These smart sensor processing methods, developed by Vista Research, Inc., may process the output of non-coherent radars or the amplitude of coherent Doppler radars using innovative, advanced signal processing methods to achieve a very high level of performance (1) for detection, tracking, and/or classification of land, maritime, or airborne objects, especially for small or slowly moving objects such as people, vehicles, small boats, ultra-lights, small aircraft and UAVs/UASs, and (2) for operation with a very low false alarm rate (FAR). These methods have been used to obtain and process radar data from radars mounted on towers, buildings, masts, tripods, vehicles, ships, and aerostats for detection and tracking of maritime, land, and airborne targets and have been incorporated into Smart Sensor Radar Processors (SSRP) and Smart Sensor Radar Systems (SSRS) for these applications. These processors are also known as Maritime Radar Processors (MRP), Land Radar Processors (LRP), and Air Radar Processors (ARP).

For some terrains and for some applications, the elevation of the radar and/or EO/IR sensor systems may not be high enough to obtain sufficient spatial coverage or sufficient target visibility for detection, tracking, and/or classification. In these instances, a lighter-than-air platform may be used instead of a tower or a mast on a mobile/transportable system to increase the elevation of the radar and electro-optical/infrared (EO/IR) cameras so that increased coverage and better visibility can be obtained. For detection and tracking of slow-moving targets such as people, the velocity of the lighter-than air platforms may need to be small. Applicable platforms may include aerostats and blimps, where blimps are essentially untethered but slow-moving aerostats.

In an example, an aerostat is a helium-filled bag with an EO/IR camera sensor system mounted on the bottom of the aerostat. Aerostats are tethered from the ground, or a ground platform during operation. FIG. 1 is a photograph of an example aerostat with an X-band radar and an EO/IR camera mounted on the bottom of the aerostat operating at altitudes between ranges of 500 ft and 2,000 ft. For some surveillance applications that require coverage at very long ranges, larger aerostats can be used at elevations of 10,000 ft., or more. Conversely, smaller aerostats can be used for operation at altitudes of only several hundred feet. Except for the motion of the aerostat, which is different than that of a tall tower, the aerostat can be thought of as a very tall tower.

As will be illustrated below, the radar data obtained from an airborne platform that moves too quickly (e.g., a small fixed wing aircraft) is smeared and detection and tracking is not possible. While helicopters and vertical take-off and landing aircraft can hover or fly slow enough, their use is very expensive, their presence is immediately known and their time on station is very limited. Aerostats have the larger coverage advantages of a parasail-based airborne platform, but at a higher cost and without the other capabilities listed above because the platform is mobile.

Ground Moving Target Indicator (GMTI) radars detect moving objects, from dismounts like people to vehicles to low-flying aircraft, against a relatively stationary land clutter background. If a GMTI radar is located on a UAS, it may have difficulty in detecting slow-moving targets such as dismounts because of an effect called Doppler smearing.

The moving target is normally distinguished from and detected by a Doppler shift of the target return relative to that of the land clutter. The land clutter may seem to have inherent motion, because it has a spectral width that is broader than expected, primarily from windblown foliage. This broadening is due to vegetation and trees that blow in the wind. For a stationary radar, this clutter spectrum typically falls off exponentially and is down to a level at ~1 m/s that a human walking at that speed (in-range component of velocity) is generally detectable. If the radar is moving transverse to the beam direction, the finite beamwidth of the radar creates a component of velocity in the range direction that is a fraction of the radar platform velocity. The proportionality constant would be equal to the sine of half the angle from boresight (normal to velocity). This Doppler shift is the same as is used to create a high-resolution image with a SAR radar. However, in the process of doing so the information about target velocity is lost for the purpose of GMTI. The moving target simply appears displaced in the image.

The effect described above means that the radar sees a spread in the Doppler spectrum of the clutter return that is due solely to the motion of the radar, and proportional to the radar beamwidth and the radar velocity. For a side-looking radar (required to scan large areas), this spreading is sufficient to severely degrade, if not render impossible, the detection of walking humans from a typical fixed wing airplane.

A coherent Doppler radar with multiple apertures can be used to detect moving targets, and to put them back in the proper position. However, this is a very complex and expensive form of radar. In various examples, the present disclosure uses a low-cost, single-aperture radar using either a coherent Doppler radar or non-coherent radar.

Because the speeds of small or slowly moving aircraft other than helicopters or vertical take-off and landing aircraft may move too fast for reliable detection and tracking of slowly moving land targets, existing technology may not be able to detect these targets. This is may be especially true for small, slowly moving land targets like people. In various examples, the slow speeds typical of parasail-type airborne platforms, both powered, unpowered, or towed are used for detection, tracking and/or classification with a real-aperture radar on an airborne platform. In contrast, the radar data obtained from an airborne platform that moves too quickly (e.g., even a small fixed wing aircraft) is smeared and detection and tracking may not be possible. While helicopters and vertical take-off and landing aircraft can hover or fly slow enough, their use is very expensive, their presence is immediately known, and their time on station is very limited. Aerostats have some of the larger coverage advantages of a parasail-based airborne platform, but at a higher cost and without the other capabilities listed above because the platform is mobile.

In various embodiments, methods and apparatuses of the present disclosure address one or more of various problems discussed above to provide a low-cost airborne radar platform for persistent, wide-area, or localized surveillance of land, maritime, and air objects, including providing and/or extending radar coverage around a tower, vehicle, aerostat, or ship platforms. In an embodiment, this need may be addressed by adding a radar system to parasails, parachutes, and other similar cloth or wind-sail, airborne platforms. In various embodiments, the airborne platform may be, but not limited to, (1) manned and unmanned, (2) powered and unpowered, (3) expendable and recoverable, (4) hover in circles or move to a specific location, and/or (5) operate high or low, to detect, track, and/or classify these targets. This type of airborne platform provides the opportunity for using a real-aperture radar for surveillance beneath the platform and cuing an EO/IR camera for classification and identification of objects detected or being tracked.

As described in Wikipedia a powered parasail or parachute (i.e., a motorized parasail or parachute) may be a parasail or parachute with motor and wheels. The airspeed is typically about 25 to 35 mph (40 to 60 km/h). The powered parasail can operate safely at heights ranging from a few feet off the ground to altitudes as high as 18,000+ feet (5.5 km), but more typically, operating heights are between 500 and 1500 feet (150 and 500 meters). With a 5 to 10 gallon fuel tank, the powered parasail can be flown for about three hours. They may have very short take-off and landing rolls, sometimes less than 100 ft (30 m) and are very inexpensive (as little as $5,000 to $10,000). A powered parasail can carry a large payload (>500 lb (225 kg)). Powered parasails are generally safer to fly than fixed wing aircraft because of their inherent stability, limited response to control inputs, and stall resistance.

In various examples, a powered parasail has one or more of the following characteristics:

Slow Airspeed (about 22-28 kt, about 11.3 to 14.4 m/s)

Inexpensive (law enforcement ultralight in a trailer costs less than a squad car)

Safe to Fly—stable without controls, resistant to stall, descends slowly if engine fails Easier to Fly than an Aircraft—just two controls: (1) adjust power and (2) pull on trailing ends of parachute/wing Easily operated by remote control Carries a large or heavy payload Long endurance—(e.g., 48 hours)

Takes off and land in a very small space—does not need an airport

Store and transport is a very small volume—fold up the parachute

Lightweight—is mostly all payload—transport in a pickup truck

Currently used by the military and law enforcement

The very slow flight minimizes air drag, allows the use of an external rotating aperture as with a marine navigation radar The payload capability of UAV/UASs may carry a 25 kW radar and processor. The payload is also sufficient to use both a radar and an EO/IR camera system that can be cued (e.g., activate for use) by the radar based upon tracks seen in the radar display. An advantage of the UAV/UAS over an aerostat (besides cost) is that it can cover a larger area and go see things up close. The processing may be done by the onboard real time processor. In an embodiment, only the radar tracks are sent down by an RF link. Thus, minimal bandwidth may be required for the radar. A much smaller and less expensive system could be implemented using a smaller radar. These systems can be remotely operated and can be designed to be expendable. Powered parasails can also be powered with a turboshaft engine. An example is a 50-HP class engine weighing 30.6 lb, designed for UAV/UASs by Kutrieb Research.

The slow speeds typical of parasail-type airborne platforms, both powered, unpowered, or towed may be used for detection, tracking and/or classification of slowly moving land targets with a real-aperture radar on an airborne platform. Parasail-based platform may use other types of sensors like EO/IR cameras, but these systems, but by themselves may not have the surveillance performance of a radar in terms of detection and tracking. Thus, in an example, the EO/IR sensors are used in conjunction with a radar so that they can be cued to a specific area for object classification and/or identification. The large payload capability of the parasail-type airborne platform may accommodate multiple sensors (EO/IR, etc.).

The addition of a radar to a parasail platform allows the efficient use of EO/IR cameras for classification and/or identification of targets through visual and infrared images and videos, because the cameras can be manually or automatically steered to the targets of interest. This advantage is especially realized if the radar is combined with the advanced signal processing algorithms because of the low false alarm radar possible using these processor systems.

The parasail-based UAS has important advantages over other types of UAS or UAV airborne platforms because of their low cost, heavy payload, and slow speed capabilities. In general, adding wide-area surveillance radars to UAV/UASs is impractical for all but the largest UAV/UASs and is expensive. Small or low-cost UAV/UASs may not have sufficient payload capacity to carry a radar, and even if they did, the radar on such a UAV/UAS platform may not function well for detecting slowly moving land targets like people, because they move to fast.

There are many applications for a Power Parasail Radar, because it can be launched from a small area and stay on stay for up to many days or longer. The Powered Parasail Radar can be launched, for example, from the deck of a ship, including a small deck, an offshore oil platform, a port or harbor, a vehicle, or the land, including rugged and enclosed terrain. The Power Parasail Radar launched from a ship can provide wide-area or persistent surveillance around the ship and/or extend the surveillance coverage of the ship's radar. Similarly, the Powered Parasail Radar can be launched from a vehicle or a land area to extend coverage around a vehicle or a tower.

Figure 2:
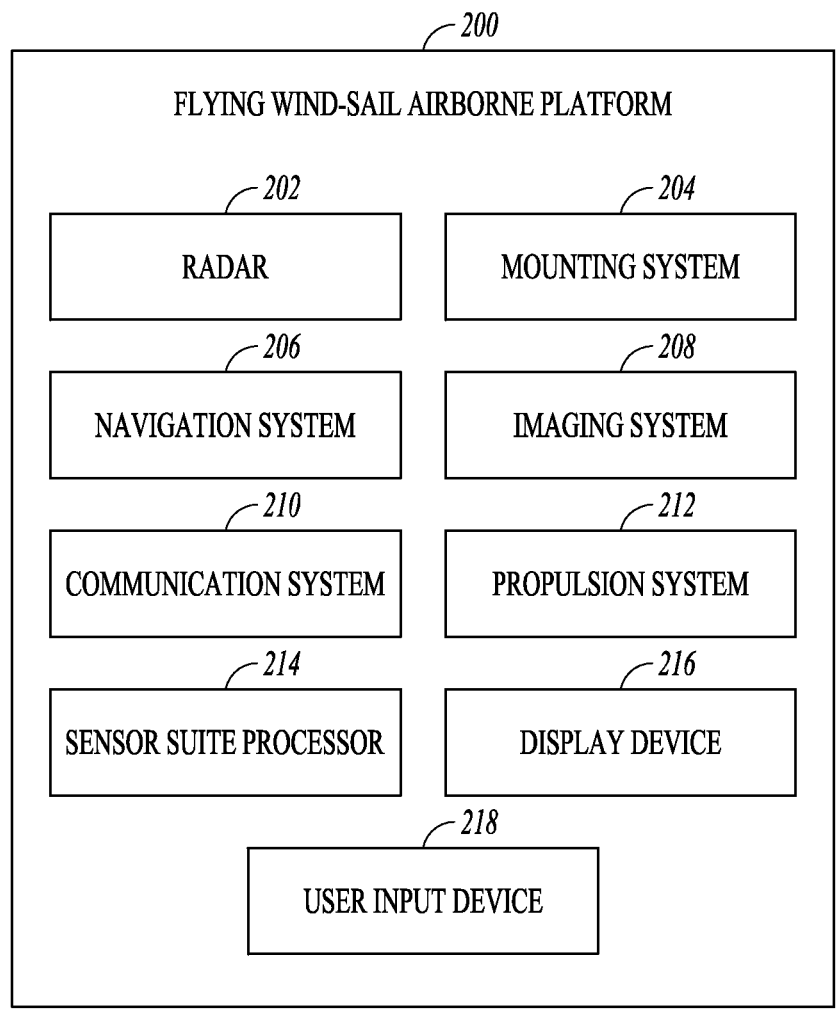
FIG. 2 is a diagrammatic representation of an airborne platform, as may be used in an example embodiment.

FIG. 2 illustrates a block diagram of a components that may be included in a flying wind-sail airborne platform 200 according to various embodiments. Platform 200 may include a radar 202 (e.g., a non-coherent, real-aperture, single-beam X-band radar with a rotating antenna). Radar 202 may be mounted on an unattended airborne system (UAS) comprised of a powered parasail with a mounting system 204 beneath it for holding the radar surveillance payload. Mounting system 204 may also include navigation system 206, imaging system 208 (e.g., EO/IR camera), a communication system 210 (e.g., radio), an engine and propeller or other propulsion system 212 for moving the parasail, various controls for steering the parasail remotely, and a sensor suite processor 214 for processing radar return signals, a display device 216 for displaying targets and user interfaces, and user input device (e.g., touch screen, mouse) 218 to receive commands to control the platform or its components.

In various embodiments, imaging system may 208 include a camera the responds in a frequency range that may be appropriate to detect a type of target that is trying to be detected. For example, the imaging system may include a camera that responds in the visible range or a hyperspectral camera.

In various embodiments, display system 216 may combine data from the various sensors on board platform 200 in a single interface. Further, display device 216 may display data received from other sensors not onboard platform 200. For example, radar 202 may transmit a command through radio 210 to a camera system on another airborne platform to take a picture of the detected target. The picture and radar may be combined on display device 216 for a user onboard platform 200 to analyze.

While not illustrated in FIG. 2, there may also be a computing device that includes a storage device that may be executed by at least one processor of the computing device. The instructions may configure the processor to store data received by one or more sensors of platform 200 (e.g., radar data, tracking data, classifying data). Thus, if the platform is unmanned the data may be retrieved for later analysis. The instructions may also be configured to present one or more user interfaces to the user (e.g., radar data, target tracks, etc).

In various embodiments, one or more of the components illustrated in FIG. 2 may be located on a different platform. For example, there may be more than one flying (parasail or otherwise), maritime, or land platforms that are in communication with platform 200. For example, there may be a camera or radar located on a tower platform that is cued from platform 200 to detect, track, or classify the target. Thus, in various embodiments, there various platforms may act in concert to detect, track, and classify various targets.

The powered parasail can be made expendable or recoverable. A lower cost system may comprise of a radar without any other sensor suite. Alternatively, instead of a non-coherent radar, a coherent Doppler radar can be used. If desired, the radar can be operated as a synthetic aperture radar. The parasail radar can be used for maritime operations or land operations. In particular, over land, slow moving targets can be masked by clutter. Over water, targets with the same speeds as ocean clutter and sea spikes can be masked as well.

Figure 3:
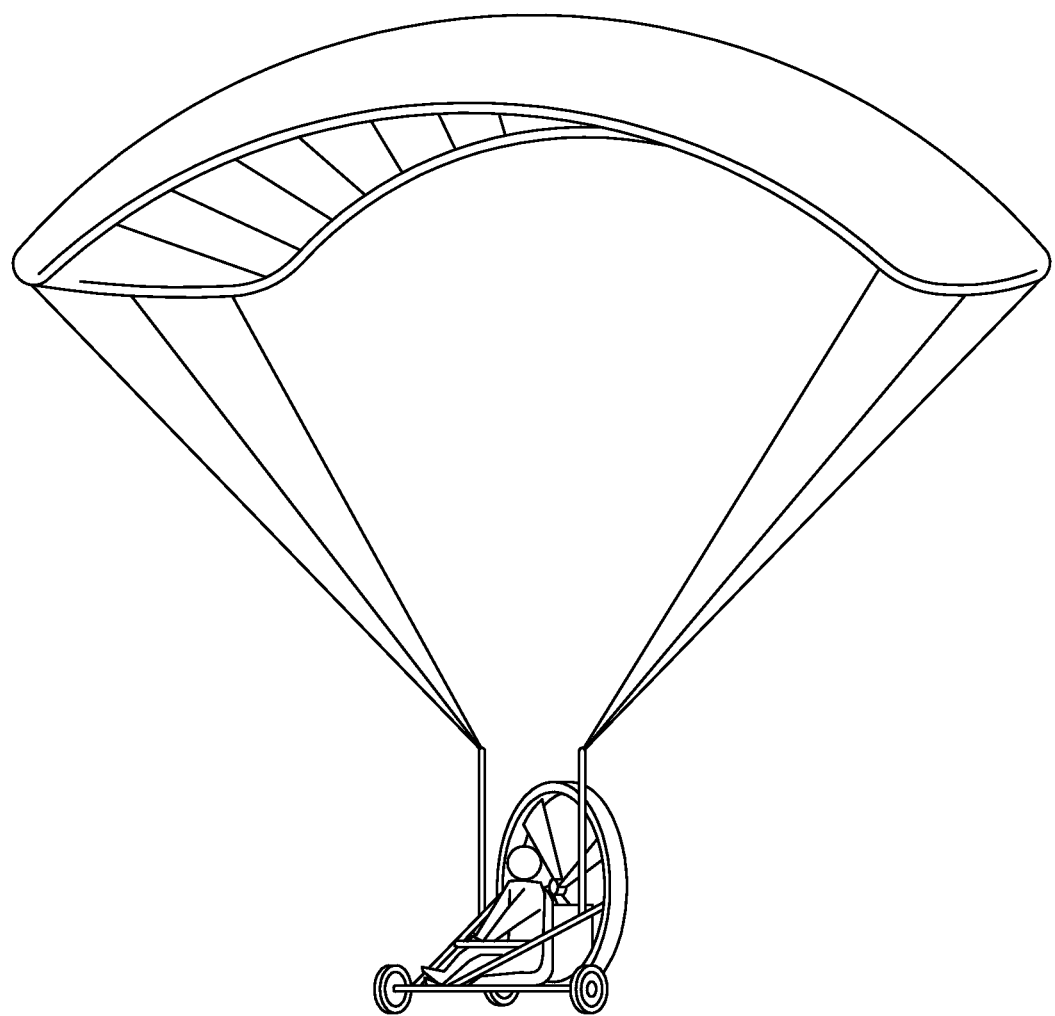
FIG. 3 is an illustration of a flying parasail, according to an example embodiment.

FIG. 3 illustrates a manned powered parasail, in an example. It is comprised of a parasail, a payload package that hangs below the parasail, a motor and propulsion system, and a control systems for steering the platform. A radar and an EO/IR camera system, if desired, is added to the payload package.

Various examples of methods and apparatuses of the present disclosure are able (1) to increase the radar surveillance coverage area obtained from conventional platforms like tower, vehicle, ship, offshore, or aerostat platforms without lowering or sacrificing performance; (2) to provide lower cost radar surveillance than those more typically found on these platforms; (3) to provide a mobile platform for extended coverage; (4) to provide a mobile platform for coverage of a specific area too far from these platforms; (5) to provide radar surveillance using a portable platform; and (6) to provide radar surveillance from a stealthy platform; (7) to provide a surveillance capability that can be launched from a small area or small platform; (8) to provide a surveillance platform capable of carrying a very heavy payload; (9) to provide a platform for unattended Aircraft Surveillance (UAS); (10) to provide a platform capable of detecting, tracking, and/or classifying slowly moving targets from an airborne platform; and (11) to provide a platform capable of detecting, tracking, and/or classifying slowly moving targets from a UAS.

Various methods and apparatuses of the present disclosure use a real-aperture radar on a parasail or parachute-based UAS for both detection, tracking, and first-order classification/identification of maritime, land, or airborne targets. If slow moving land targets are to be detected and tracked, then a slow-moving UAS like the present disclosure may be needed. Otherwise, targets like walkers may not be detected.

There is a surveillance need for the operation of such a ground moving target detection and tracking radar from a moving airborne platform, like an UAV/UAS, to achieve greater elevations, and therefore, greater ranges than achieved on ships, buoys, offshore platforms, or coastal towers for maritime applications or towers, buildings, vehicles, and tripods for land applications and different look angles and greater coverage than an aerostat and the aforementioned platforms. There is a potential problem with an airborne platform for slow-moving targets, especially slow-moving land targets like people, because the Doppler spectrum will become smeared as a result of the motion. That problem is compounded by the fact that the UAV/UAS would likely be a very small aircraft, and therefore require the use of a very small radar antenna (e.g., a 2-ft antenna) that would need to be mounted in the fuselage and looking out to the side.

As a way to circumvent this problem, an example has been developed in which the UAV/UAS may be flown in a tight circle (in a double-standard-rate turn) so that the UAV/UAS platform would act as an armature to the side-looking radar (as if it were simply rotating about an axis). The UAV/UAS could complete such an orbit in about one minute. This low update rate may pose a problem for a tracker, but also the orbit may not sufficiently reduce the Doppler smear to allow detection of slow-moving targets. A quantitative model evaluation was performed to illustrate the effect that the motion effect of a 1-min UAV/UAS orbit has on the Doppler detection capability of the radar. These model computations were also used to illustrate how a radar mounted on moving airborne platform like a powered parasail or parachute, a towed wind sail, a blimp, or a slowly moving ultra-light may alleviate or minimize the Doppler smearing by flying much more slowly than a UAV/UAS or fixed wing aircraft and by using a larger antenna (i.e., aperture) to obtain a narrower beam. The Doppler smearing effect is minimized because it is proportional to the speed and to the beamwidth. The use of a slow-moving airborne platform and/or a larger antenna (i.e., smaller beamwidth) will also improve the tracker update rate by scanning the radar over 360°. This type of platform may also allow the use of an inexpensive non-coherent radar with high power, which is has been implemented by Vista Research on a aerostat. In various embodiments, an average antenna rotation is 24 or 42 RPM. In an embodiment, for small targets over land, slower speeds of 1 to 10 may be used would suffice and for some small targets, like small maritime targets, higher rotation speeds than normal may be used. In an embodiment, there are two beamwidths of interest: The vertical beamwidth and the horizontal or azimuthal beamwidth. A wide or large vertical beam width may be determined by platform motion, where the distinction is when motion begins losing the target (i.e., missing the target) and/or where a narrower beamwidth is needed for a higher signal to noise or signal to clutter ratio. A narrower beam may be effected also by processing overlapped sections of a wide beam.

While an airborne radar has obvious operational advantages in terms of target coverage and target visibility, as explained above, it may important to find a way to create a flying radar that flies very slowly. Increased target coverage and visibility can be achieved using a tethered aerostat, but its coverage is still limited to the launch location. A blimp would be an alternative, but operationally not very attractive. Adding a radar to a powered or towed parasail or parachute may meet all three criteria of increased target coverage, target visibility, and slow platform speed.

Various examples of the present disclosure improve upon existing technology (1) to increase the radar surveillance coverage area over that obtained from conventional platforms like tower, vehicle, ship, offshore, or aerostat platforms; (2) to provide a lower cost radar surveillance capability than those typically found on these platforms; (3) to provide a mobile platform for extended coverage by operating at higher elevations; (4) to provide a mobile platform for coverage of a specific area too far away from these platforms; (5) to provide radar surveillance using a portable platform; (6) to provide radar surveillance from an airborne platform; (7) to provide radar surveillance from a stealthy platform; (8) to provide a surveillance capability that can be launched from a small area or small platform (e.g., deck of a ship); (9) to provide a surveillance platform capable of carrying a very heavy payload; (10) to provide a platform for unattended Aircraft Surveillance (UAS); (11) to provide a platform capable of detecting, tracking, and/or classifying slowly moving targets from an airborne platform, especially land targets; and (12) to provide a platform capable of detecting, tracking, and/or classifying slowly moving targets from a UAS.

Figure 4:
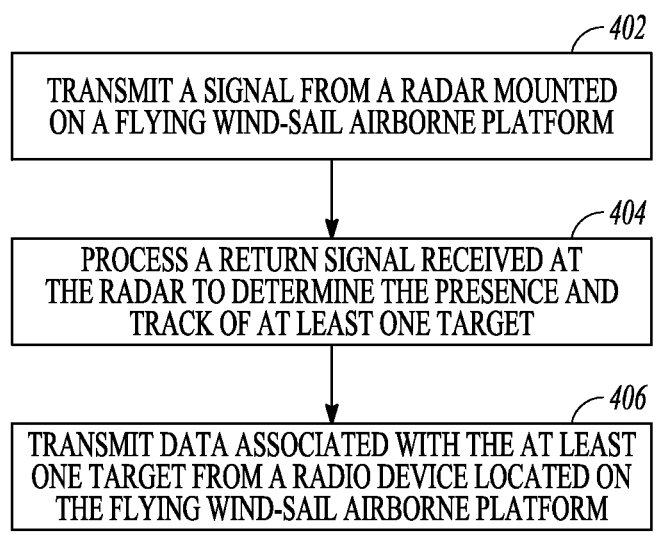
FIG. 4 is a flow chart illustrating a method using a flying wind-sail airborne platform, according to an example embodiment.

FIG. 4 is a flow chart illustrating a method using a flying wind-sail airborne platform, according to an example embodiment. At block 402, a signal may be transmitted from a radar mounted on a flying wind-sail airborne platform. At block 404, a return signal received at the radar may be processed to determine the presence and track of at least one target. At block 406 data associated with the at least one target from a radio device located on the flying wind-sail airborne platform may be transmitted to a computing device. The computing device may be a computer located remote from the airborne platform that is controlling the radar. The computing device may include a display that show tracks of targets detected by the radar.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An airborne platform comprising:
   an untethered wind-sail;
   a propulsion system;
   a radar configured to detect at least one target; and
   an imaging system configured to classify the at least one target, wherein the imaging system is cued to classify the at least one target by the radar.

2. The airborne platform of claim 1, further comprising: a computing device to collect radar data from the radar.

3. The airborne platform of claim 1, further comprising: a radio device configured to transmit data associated with the at least one target.

4. The airborne platform of claim 1, wherein the radar comprises a non-coherent radar and wherein the airborne platform comprises a processor to process data obtained by the radar to determine a track of the at least one target.

5. The airborne platform of claim 1, further comprising a processor to process data obtained by the radar to determine a track of the at least one target.

6. The airborne platform of claim 5, further comprising:
   a display device configured to display the track of the at least one target.

7. The airborne platform of claim 5, further comprising a radio configured to transmit the at least one track to a computing device for display by the computing device.

8. The airborne platform of claim 1, further comprising a storage device configured to store data collected by the radar.

9. The airborne platform of claim 1, further comprising a plurality of sensors and wherein the storage device stores data captured by the plurality of sensors.

10. The airborne platform of claim 1, further comprising:
    a plurality of sensors; and
    a display device configured to combine and display data captured by at least two of the plurality sensors.

11. The airborne platform of claim 1, wherein the imaging system includes a camera.

12. The airborne platform of claim 11, wherein the camera is configured to respond to a frequency range based on a type of target requested to detect.

13. The airborne platform of claim 12, wherein the camera is a hyperspectral camera.

14. The airborne platform of claim 1, wherein the imaging system includes an infrared sensor.

15. The airborne platform of claim 1, wherein the at least one target includes a person.

16. The airborne platform of claim 1, wherein the at least one target includes a small boat.

17. The airborne platform of claim 1, wherein the radar is a coherent radar.

18. The airborne platform of claim 1 wherein the propulsion system is configured to move the airborne platform in response to commands received at a radio device of the airborne platform.

* * * * *